US007076525B1

(12) United States Patent
Matsuda et al.

(10) Patent No.: US 7,076,525 B1
(45) Date of Patent: Jul. 11, 2006

(54) VIRTUAL SPACE SYSTEM, VIRTUAL SPACE CONTROL DEVICE, VIRTUAL SPACE CONTROL METHOD, AND RECORDING MEDIUM

(75) Inventors: Satoru Matsuda, Kanagawa (JP); Katsushige Hata, Tokyo (JP)

(73) Assignee: Sony Corporation, Tokyo (JP)

( * ) Notice: Subject to any disclaimer, the term of this patent is extended or adjusted under 35 U.S.C. 154(b) by 755 days.

(21) Appl. No.: 09/714,743

(22) Filed: Nov. 16, 2000

(30) Foreign Application Priority Data

Nov. 24, 1999 (JP) .............................. P11-333074

(51) Int. Cl.
*G06F 15/16* (2006.01)
(52) U.S. Cl. ...................... 709/205; 709/204; 709/206
(58) Field of Classification Search ................ 709/201, 709/204–206, 217, 227, 230, 238
See application file for complete search history.

(56) References Cited

U.S. PATENT DOCUMENTS 5,736,982 A * 4/1998 Suzuki et al. ............... 345/706
5,926,179 A * 7/1999 Matsuda et al. ............ 345/752
5,956,038 A * 9/1999 Rekimoto ................... 345/419
6,057,856 A * 5/2000 Miyashita et al. .......... 345/633
6,219,045 B1 * 4/2001 Leahy et al. ................ 345/757
6,487,557 B1 * 11/2002 Nagatomo ................... 707/102
2001/0011293 A1 * 8/2001 Murakami et al. .......... 709/201

* cited by examiner

*Primary Examiner*—Krisna Lim
*Assistant Examiner*—Yasin Barqadle
(74) *Attorney, Agent, or Firm*—Bell, Boyd & Lloyd LLC (57) ABSTRACT

In a virtual space system, it is made possible to freely set a region where a chat is recorded, without reducing a chat feasible region and complicating the system. A server is provided with user objects for holding latest position information of a transmitter in a virtual space and transmission region definition information for defining a transmission region, and chat reception objects for holding latest position information of application objects and reception region definition information for defining a reception region, and only contents of a chat issued from the transmitter in the reception region or only contents of a chat issued from the transmitter when the reception object enters the transmission region are stored in a chat storage file.

10 Claims, 8 Drawing Sheets

VIRTUAL SPACE SYSTEM, VIRTUAL SPACE CONTROL DEVICE, VIRTUAL SPACE CONTROL METHOD, AND RECORDING MEDIUM

BACKGROUND OF THE INVENTION

1. Field of the Invention

The present invention relates to a virtual space system having a chat function, a virtual space control device, a virtual space control method, and a recording medium, and particularly to a virtual space system in which only a chat in a restricted region is recorded, a virtual space control device, a virtual space control method, and a recording medium storing a program causing a computer to execute the function.

2. Description of the Related Art

In recent years, with the advance of an electric communication information network such as the Internet, communication through a chat using electric communication means has become popular. The chat is a system in which a plurality of users connect with a predetermined server through an electric communication line and documents are transmitted and received in real time through the server to have a conversation. Although the mainstream of a conventional chat function is such that text information composed of only documents is exchanged to have a conversation, in recent years, there has appeared such a visual chat that a virtual space is formed on a server, a user makes a character (hereinafter referred to as an avatar) acting for the user himself or herself join in the virtual space, and the user has a chat with an avatar of another user while operating his or her avatar in the virtual space. In such a visual chat, since the user moves his avatar in the virtual space and can have a chat with another avatar upon which the user comes across in the virtual space, it is possible to have the chat in an atmosphere closer to an actual conversation than a conventional form.

Although the contents of documents exchanged through the chat in this way are recorded in the server, according to circumstances, there also occurs a case where the contents of all chats performed in the virtual space are not recorded but only the contents of a chat performed in a restricted region are recorded. In the case where an attempt is made to record only the contents of a chat made in the restricted region like this, conventionally, such a method as to construct one virtual space by a plurality of servers and to record the chat contents in each server has been carried out.

However, in the method of using the plurality of servers, there is a problem that a chat with an avatar belonging to another server can not be made.

Besides, in this method, there is a problem that the plurality of servers must be started, so that the system can not be made simple.

SUMMARY OF THE INVENTION

The present invention has been made in view of such problems, and an object of the invention is to provide a virtual space system in which a region where a chat is recorded can be freely set without reducing a chat feasible region and complicating a system, a virtual space control device, a virtual space control method, and a recording medium storing a program for causing a computer to execute the function.

According to the present invention, in a virtual space system having a chat function, the virtual space system is characterized by comprising a virtual space control device including transmission object holding means for holding latest position information of a transmitter in a virtual space and transmission region definition information for defining a transmission region as a closed region at a side of the transmitter, and reception object holding means for holding latest position information of a reception object and reception region definition information for defining a reception region as a closed region at a side of the reception object, and chat storage means for storing only contents of a chat issued from the transmitter in the reception region or only contents of a chat issued from the transmitter when the reception object enters the transmission region.

Here, the transmission object holding means holds the latest position information of the transmitter in the virtual space and the transmission region definition information for defining the transmission region as the closed region at the side of the transmitter, the reception object holding means holds the latest position information of the reception object and the reception region definition information for defining the reception region as the closed region at the side of the reception object, and the chat storage means stores the contents of the chat issued from the transmitter in the reception region or the contents of the chat issued from the transmitter when the reception object enters the transmission region.

Besides, in a virtual space control device for controlling a virtual space having a chat function, the virtual space control device is characterized by comprising transmission object holding means for holding latest position information of a transmitter in the virtual space and transmission region definition information for defining a transmission region as a closed region at a side of the transmitter, and reception object holding means for holding latest position information of a reception object and reception region definition information for defining a reception region as a closed region at a side of the reception object, wherein only contents of a chat issued from the transmitter in the reception region or only contents of a chat issued from the transmitter when the reception object enters the transmission region are stored.

Here, the transmission object holding means holds the latest position information of the transmitter in the virtual space and the transmission region definition information for defining the transmission region as the closed region at the side of the transmitter, and the reception object holding means holds the latest position information of the reception object and the reception region definition information for defining the reception region as the closed region at the side of the reception object.

Further, in a control method of a virtual space having a chat function, the virtual space control method is characterized by comprising the steps of holding latest position information of a transmitter in the virtual space and transmission region definition information for defining a transmission region as a closed region at a side of the transmitter, holding latest position information of a reception object and reception region definition information for defining a reception region as a closed region at a side of the reception object, and storing only contents of a chat issued from the transmitter in the reception region or only contents of a chat issued from the transmitter when the reception object enters the transmission region.

By this, in the virtual space, it becomes possible to freely set a region in which a chat is recorded.

Further, a recording medium is characterized by comprising the steps of storing a program for causing a computer to execute functions of holding latest position information of a transmitter in a virtual space and transmission region definition information for defining a transmission region as a closed region at a side of the transmitter, holding latest position information of a reception object and reception region definition information for defining a reception region as a closed region at a side of the reception object, and storing only contents of a chat issued from the transmitter in the reception region or only contents of a chat issued from the transmitter when the reception object enters the transmission region.

By causing the program stored in the recording medium to be started in a computer, it becomes possible to freely set a region where a chat is recorded in the virtual space.

DETAILED DESCRIPTION OF THE PREFERRED EMBODIMENTS

Embodiments of the present invention will be described below with reference to the drawings.

Figure 1:
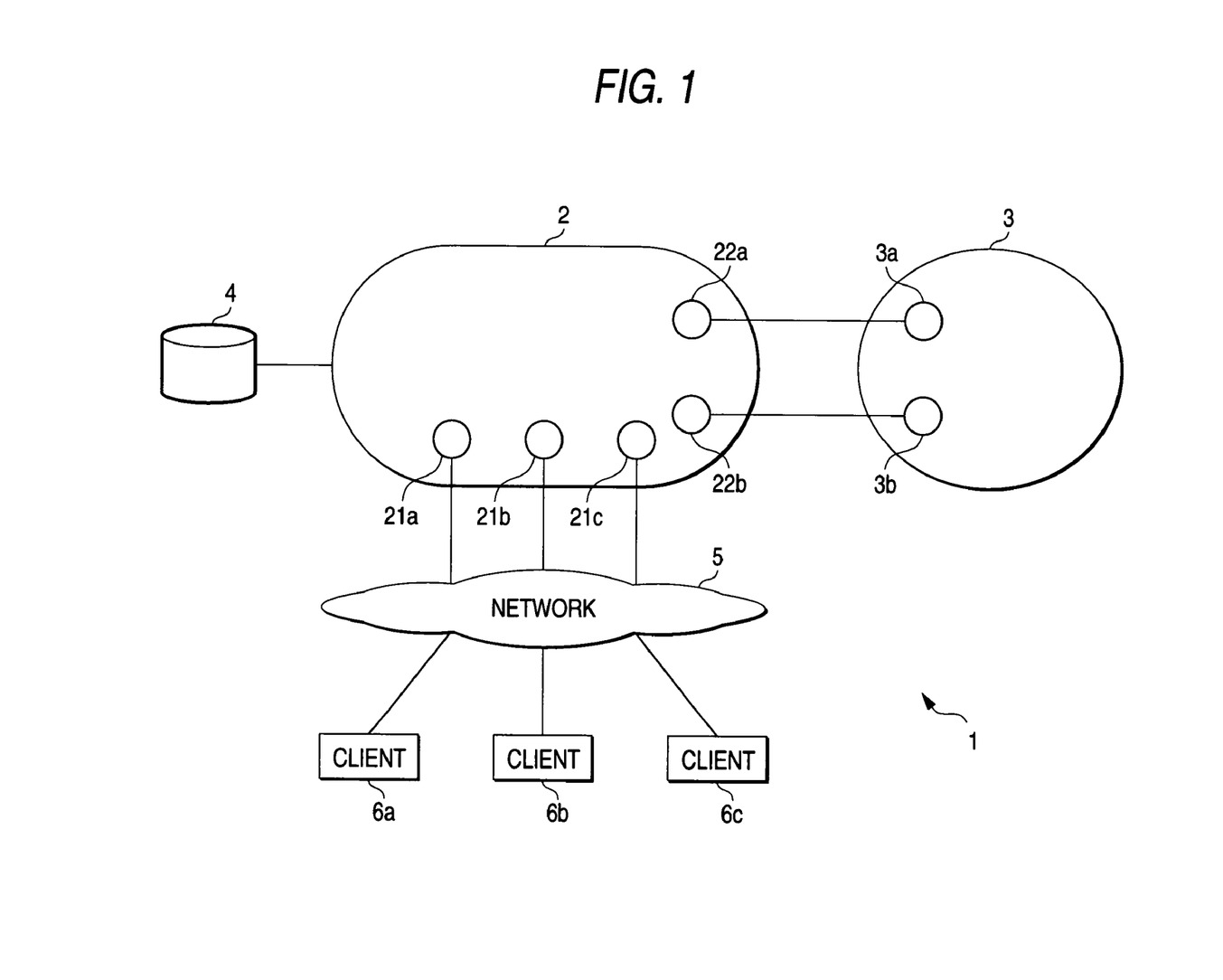
FIG. 1 is a structural view showing a structure of a virtual space system.

FIG. 1 is a structural view showing a structure of a virtual space system 1 of this embodiment.

The virtual space system 1 is constituted by a sever 2 as a virtual space control device for controlling a virtual space, an application object server 3 as a reception object control device for preparing and controlling a reception object, a chat storage file 4 as chat storage means for storing the contents of a chat issued from a transmitter, a network 5 as electric communication means with which a plurality of users connect, and clients 6a, 6b and 6c as users for operating the transmitters in the virtual space.

Here, the server 2 includes user objects 21a, 21b and 21c as transmission object holding means for holding latest position information of the transmitter in the virtual space and transmission region definition information for defining a transmission region as a closed region at the side of the transmitter, and chat reception objects 22a and 22b as reception object holding means for holding latest position information of the reception object and reception region definition information for defining a reception region as a closed region at the side of the reception object The application object server 3 includes application objects 3a and 3b as prepared reception objects.

The user objects 21a, 21b, and 21c are provided in one-to-one correspondence to the clients 6a, 6b and 6c, and the respective clients 6a, 6b and 6c issue instructions to the corresponding user objects 21a, 21b and 21c through the network 5.

The application object server 3 can communicate with the server 2, the chat reception objects 22a and 22b are provided in one-to-one correspondence to the application objects 3a and 3b, and the chat reception objects 22a and 22b are dynamically defined in accordance with the change of the application objects 3a and 3b.

The chat storage file 4 is electrically connected to the server 2.

Figure 2:
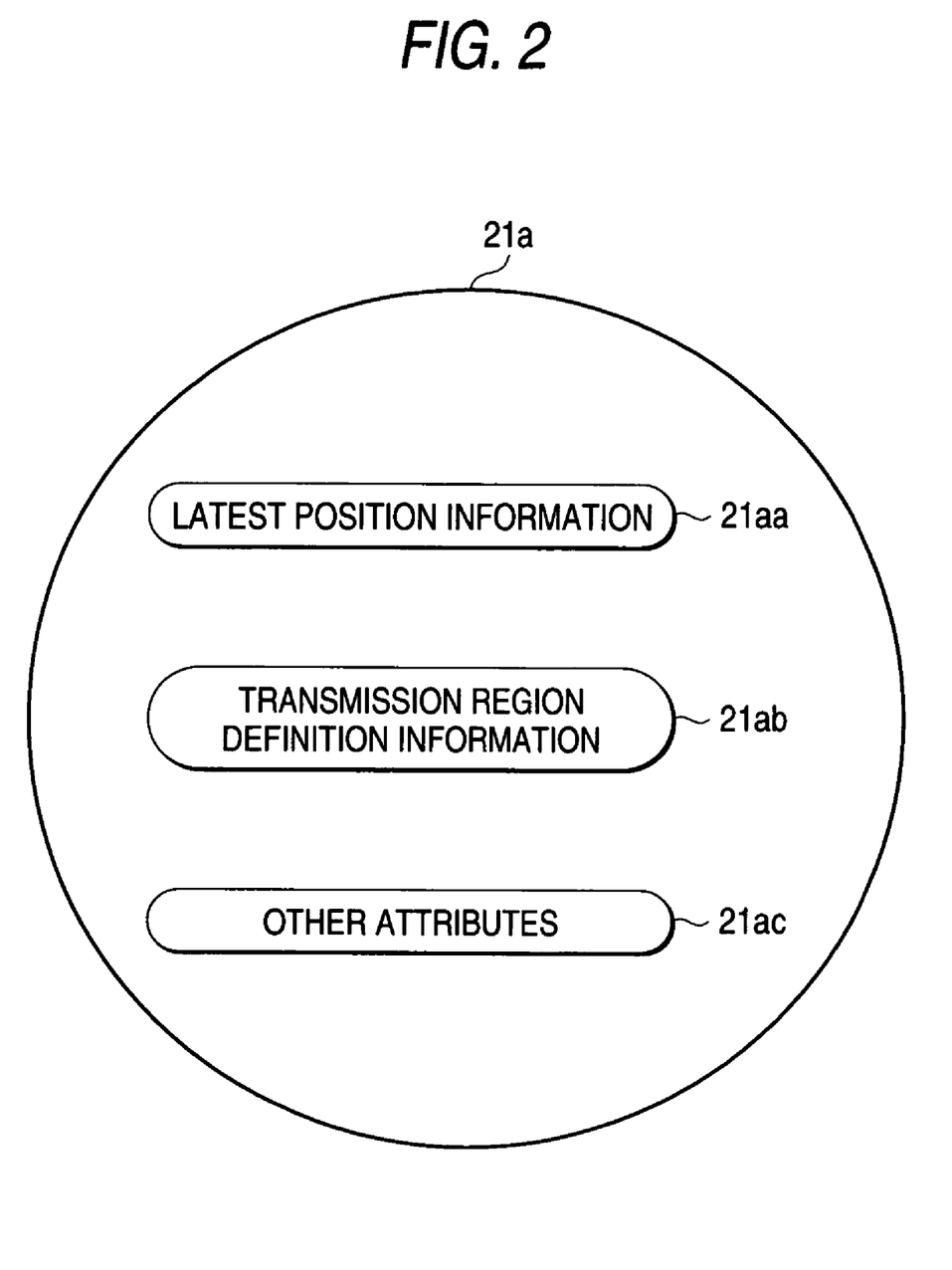
FIG. 2 is a view showing the contents of a user object.

FIG. 2 is a view showing the contents of the user object 21a. Incidentally, the user objects 21b and 21c also have the same contents as the user object 21a.

The user object 21a is constituted by latest position information 21aa, transmission region definition information 21ab, and other attributes 21ac.

The latest position information 21aa is latest position information of the transmitter in the virtual space. The transmission region definition information 21ab is information for defining a transmission region where a chat is recorded in the virtual space, and is defined by two-dimensional elements in the virtual space. Incidentally, this transmission region may be defined while relation to the latest position information 21aa is established.

Figure 3:
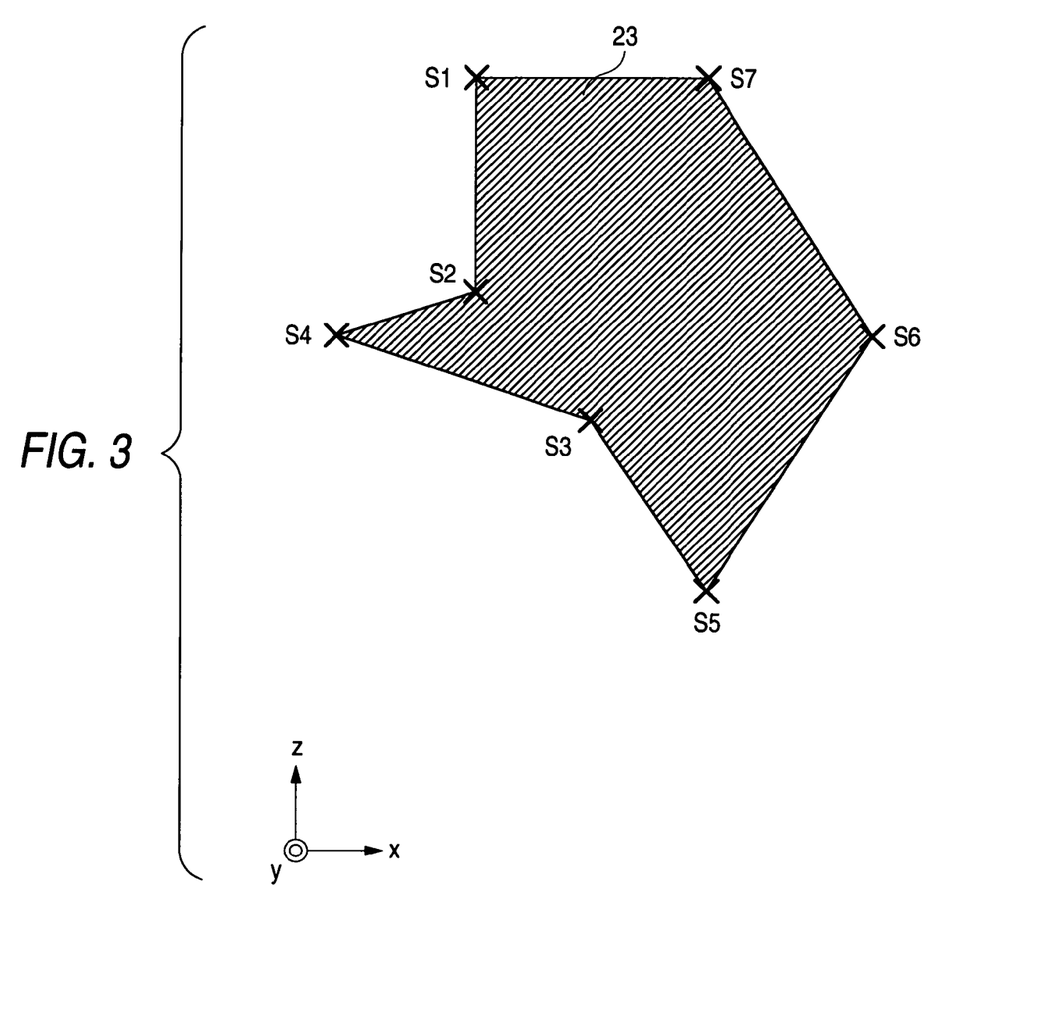
FIG. 3 is a view showing an example of a transmission region defined by transmission region definition information.
Figure 4:
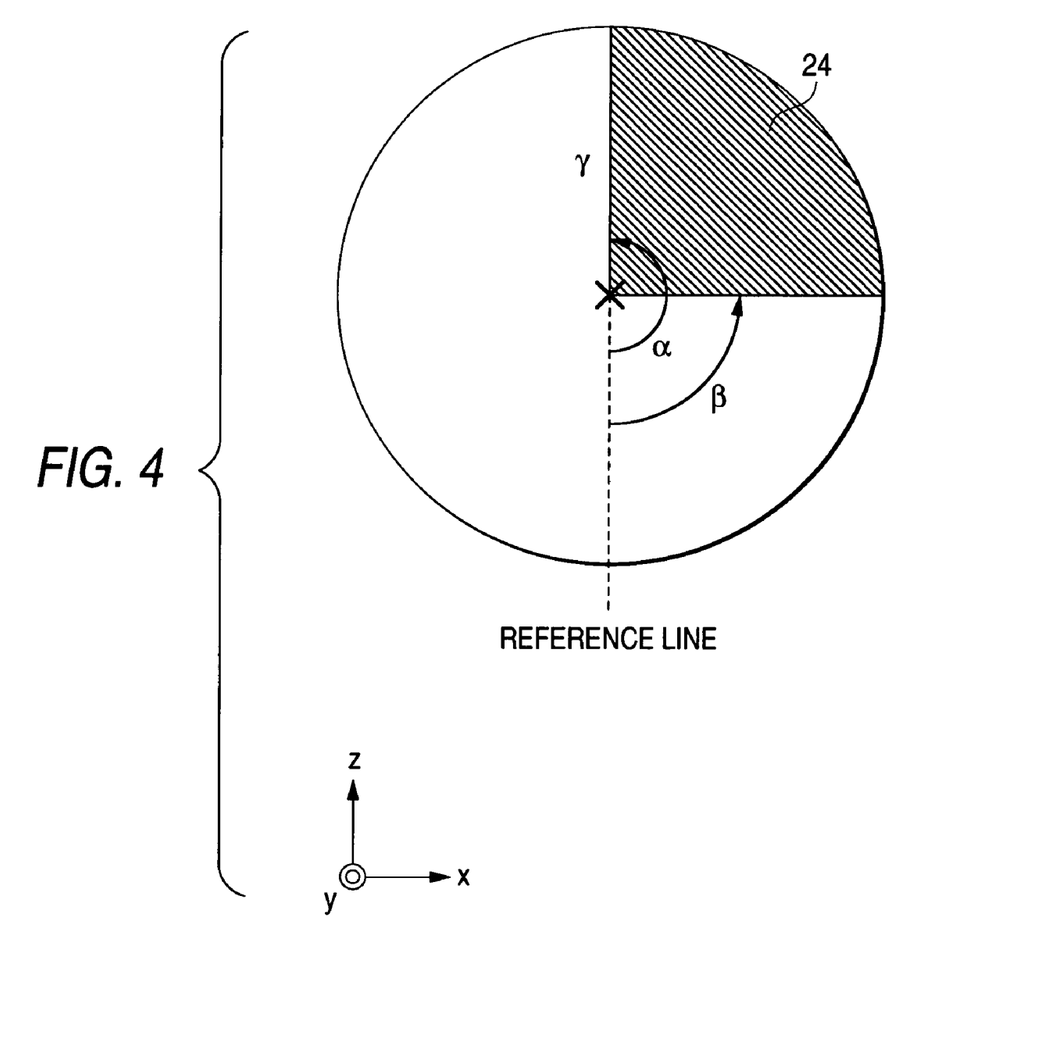
FIG. 4 is a view showing an example of a transmission region defined by transmission region definition information.
Figure 5:
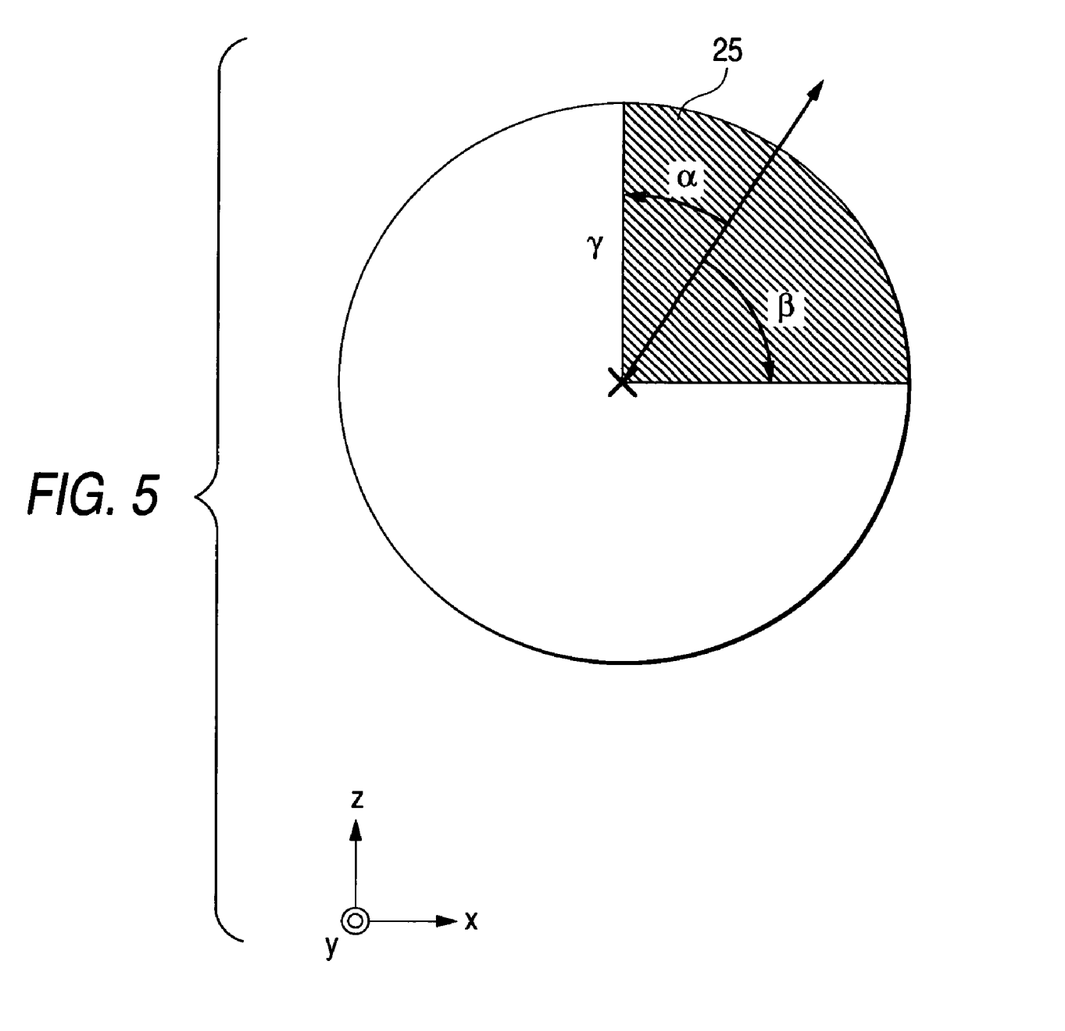
FIG. 5 is a view showing an example of a transmission region defined by transmission region definition information.

FIGS. 3 to 5 are views showing examples of transmission regions 23, 24 and 25 defined by the transmission region definition information 21ab. Incidentally, in these drawings, directions parallel to the paper plane are made an x axis and a z axis, and a direction normal to the paper plane is made a y axis.

FIG. 3 is a view showing the transmission region 23 defined by a polygonal column. The transmission region 23 is an inner region of the polygonal column defined by two-dimensional elements of the x axis and the z axis, and restriction in the y-axis direction is not provided in this transmission region 23. Reference characters S1 to S7 designate apexes of this polygonal column, and the shape of the transmission region 23 is set by the number of these and the respective x-z coordinates.

FIG. 4 is a view showing the transmission region 24 defined by a segmental column. The transmission region 24 is an inner region of the segmental column defined by two-dimensional elements of the x axis and the z axis, and restriction in the y-axis direction is not provided in this transmission region 24. Here, $\alpha$ and $\beta$ designate angles from a certain reference line, and by these, the extension of the segmental column is defined. Besides, $\gamma$ designates a radius of the segmental column.

Similarly to the transmission region 24, the transmission region 25 of FIG. 5 is also an inner region of a segmental column defined by two-dimensional elements of the x axis and the z axis, and restriction in the y-axis direction is not provided also in this transmission region 25. The difference between the transmission regions 25 and 24 is in a method of defining the segmental column. In the transmission region 24, angles from the certain reference line are made $\alpha$ and $\beta$, and the extension of the segmental column is defined by these angles. On the other hand, in the transmission region 25, left-right angles with respect to a direction related to a direction of a transmitter, for example, a visual field direction are made $\alpha$ and $\beta$, and the extension of the segmental column is defined by those. Here, the visual field direction indicates a visual field direction of a transmitter in the virtual space, and by defining the transmission region 25 in this way, it is possible to determine a more realistic transmission region in the virtual space.

Figure 6:
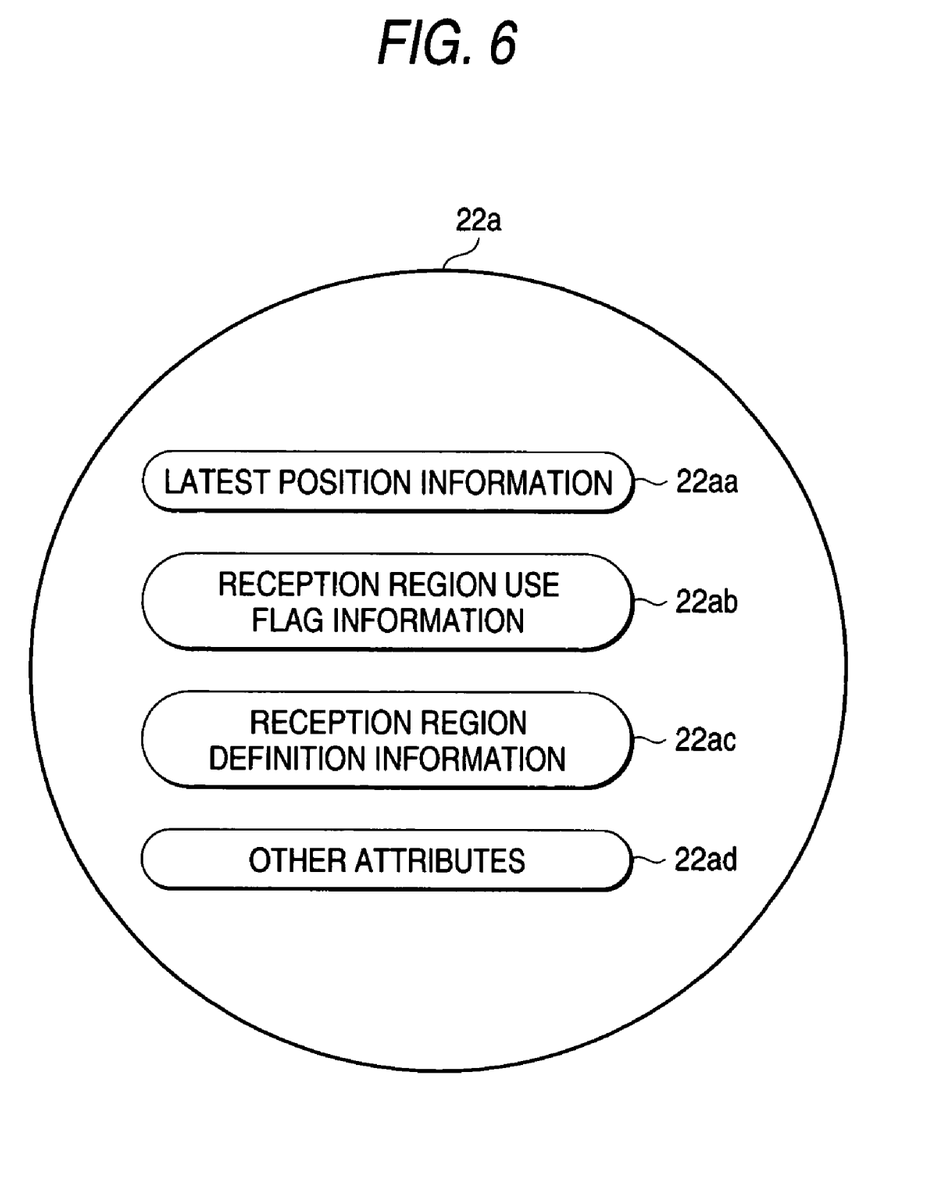
FIG. 6 is a view showing the contents of a chat reception object.

FIG. 6 is a view showing the contents of the chat reception object 22a. Incidentally, the chat reception object 22b also has the same contents as the chat reception object 22a.

The chat reception object 22a is constituted by latest position information 22aa of the application object 3a, reception region use flag information 22ab as reception region use information indicating whether the reception region is used, reception region definition information 22ac, and other attributes 22ad.

The latest position information 22aa is latest position information of the application object 3a in the virtual space. The reception region use flag information 22ab indicates whether the reception region is used. The reception region definition information 22ac is information defining a reception region where a chat is recorded in the virtual space, and is defined by two-dimensional elements in the virtual space. Incidentally, this reception region may be defined while relation to the latest position information 22aa is established. The method of defining the reception region may be the same as the transmission region, and is defined like, for example, the transmission regions 23, 24 and 25 shown in FIGS. 3 to 5.

Next, with reference to FIGS. 1, 2 and 6, the operation of the virtual space 1 will be described.

The clients 6a, 6b and 6c using the virtual space system 1 first connect with the server 2 through the network 5, and make their own avatars join in the virtual space. In the case where the respective clients 6a, 6b and 6C operate the respective avatars and chats are made in the virtual space, in accordance with the following judgement procedure, the server 2 judges whether or not recording of an issued chat is made.

First, the server refers to the reception region use flag information held by the respective chat reception objects 22a and 22b, and judges whether or not it is the content indicating that the reception region is used. In the case where it is the content indicating that the reception region is used (in the case of truth), the latest position information of the avatar which becomes a transmitter held by the user object corresponding to the client issuing the chat is compared with the reception region defined by the chat reception object in which the reception region use flag information is true, and it is judged whether or not the latest position of the transmitter is contained in this reception region. Here, in the case where it is judged that the position is contained in the reception region, the contents of the issued chat are recorded in the chat storage file 4. At this time, recording to the chat storage file 4 is made while correspondence is made to each chat reception object defining the reception region in which the latest position of the transmitter is contained. On the other hand, in the case where it is judged that the latest position of the transmitter is not contained in this reception region, recording of the issued chat is not made.

In the case where the reception region use flag information is the content indicating that the reception region is not used (in the case of falsehood), the latest position information of the application object is compared with the transmission region of the transmitter issuing the chat, and it is judged whether or not the latest position of the application object is contained in this transmission region. Here, in the case where it is judged that the latest position is contained in the transmission region, the contents of the issued chat are recorded in the chat storage file 4. At this time, recording to the chat storage file 4 is made while correspondence is made to the application object contained in the transmission region of the transmitter issuing the chat. On the other hand, in the case where the latest position of the application object is not contained in this transmission region, recording of the issued chat is not made.

Figure 7:
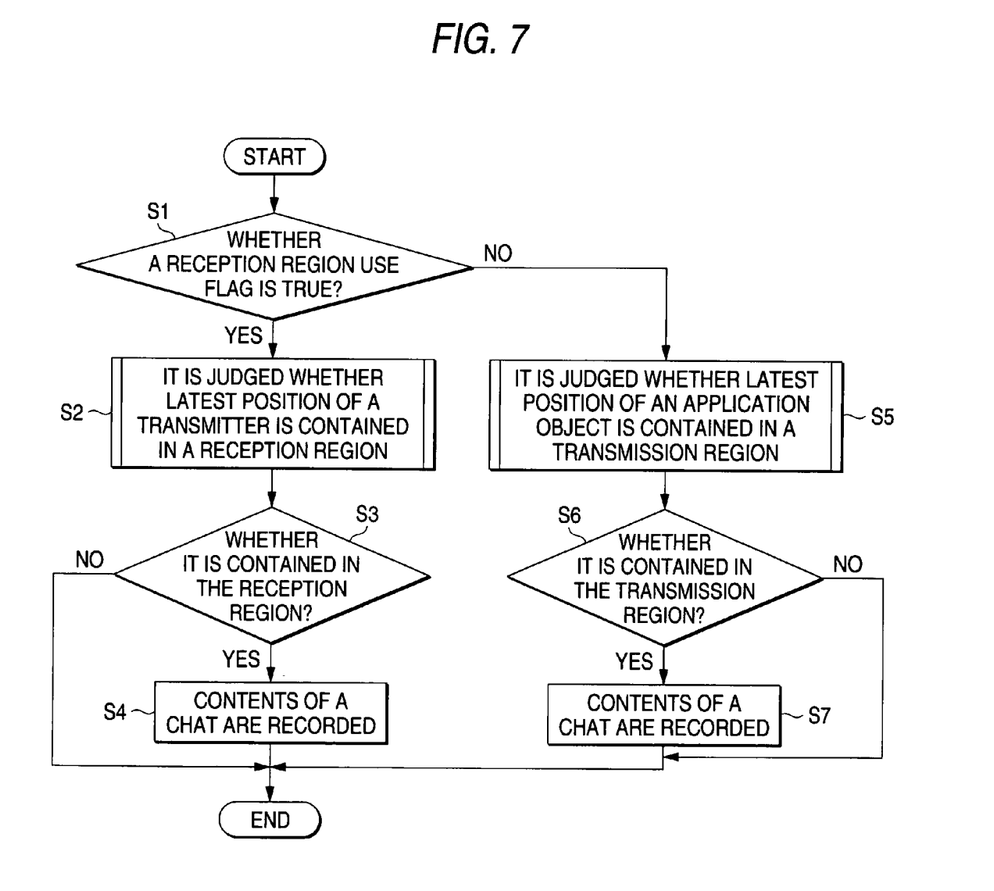
FIG. 7 is a flowchart showing a judgement procedure as to whether or not a chat is recorded.

FIG. 7 is a flowchart showing a judgement procedure as to whether or not a chat is recorded.

(S1) Reference is made to the reception region use flag information held by the respective chat reception objects 22a and 22b, and judgement is made as to whether or not it is true. In the case of truth, the procedure proceeds to step S2. In the case of falsehood, the procedure proceeds to step S5.

(S2) It is judged whether or not the latest position of the transmitter is contained in the reception region.

(S3) In the case where the position is contained in the reception region, the procedure proceeds to step S4. In the case where the position is not contained, the processing is ended.

(S4) The contents of the issued chat are recorded for each chat reception object having the reception region where the transmitter of the chat is contained.

(S5) It is judged whether or not the latest position of the application object is contained in the transmission region.

(S6) In the case where it is judged that the latest position is contained in the transmission region, the procedure proceeds to step S7. In the case where it is judged that the position is not contained, the processing is ended.

(S7) The contents of the issued chat are made to correspond to the application object contained in the transmission region of the transmitter issuing the chat and are recorded.

Figure 8:
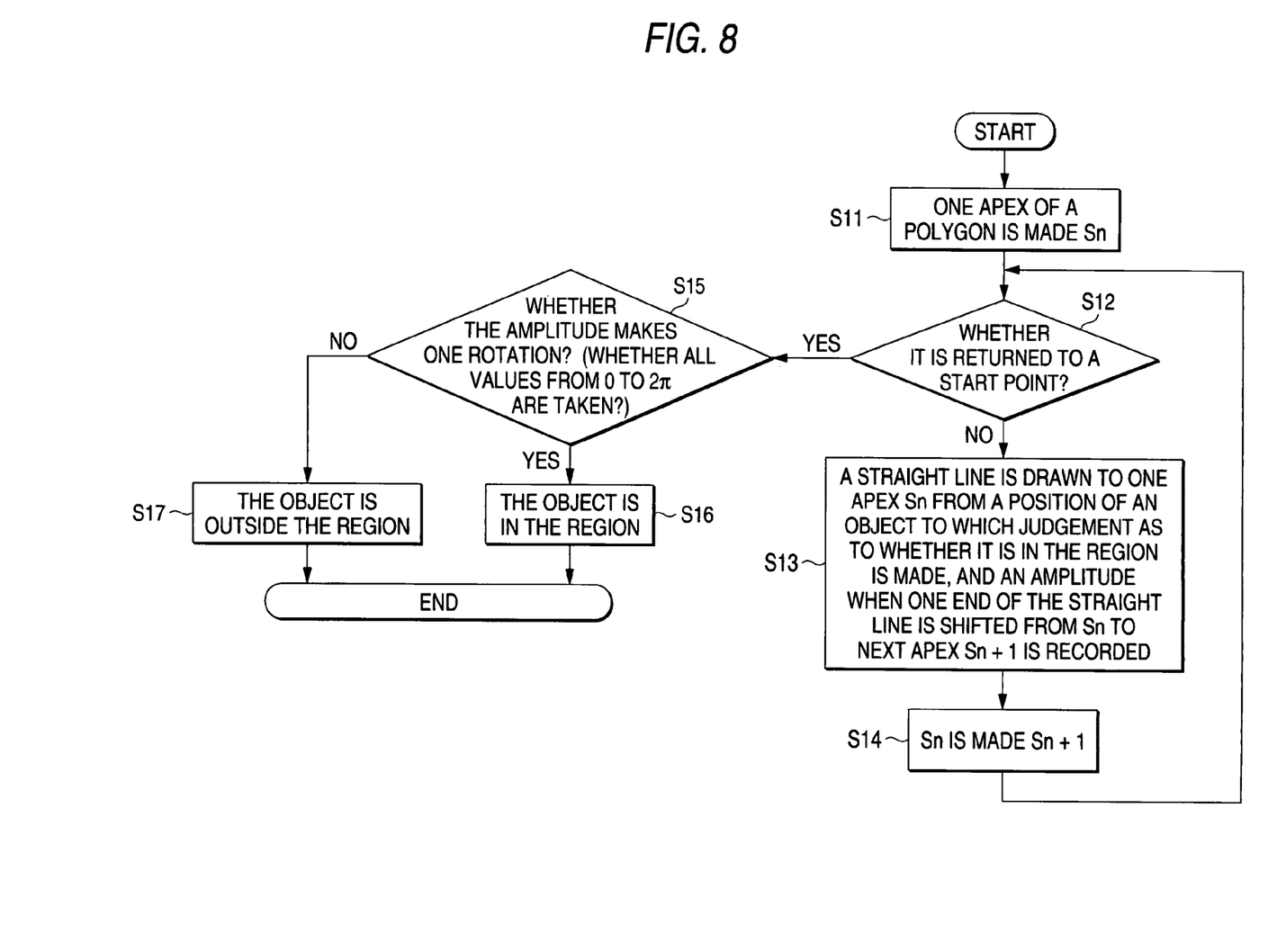
FIG. 8 is a flowchart exemplifying a specific procedure of judgement at step S2 and step S5 in FIG. 7.

FIG. 8 is a flowchart exemplifying a specific procedure of judgement at step S2 and step S5 of FIG. 7. Incidentally, in this example, the transmission region 23 shown in FIG. 3 is used as a region.

(S11) One of the apexes of the polygon constituting the region is made Sn.

(S12) It is judged whether or not an apex which becomes a standard for judgement returns to an apex of a start point. In the case where it returns to the apex of the start point, the procedure proceeds to step S15. In the case where it does not return to the apex of the start point, the procedure proceeds to step S13.

(S13) A straight line is drawn to the apex Sn from the position of the object to which judgement as to whether or not it is in the region is made, and next, an amplitude (angle range restricted by an angle between the straight line drawn from the object to the apex Sn and one reference line provided, and an angle between the straight line drawn from the object to the apex Sn+1 and this reference line) when one end of the straight line is shifted from the apex Sn to the next apex Sn+1 is recorded.

(S14) Sn is made Sn+1. By this, the apex Sn as the reference of judgement is shifted to the next apex.

(S15) It is judged whether or not the whole angle range of 0 to $2\pi$ is occupied by all amplitudes recorded at step S13. In the case where the whole angle range is occupied, the procedure proceeds to step S16. In the case where the whole angle range is not occupied, the procedure proceeds to step S17.

(S16) It is judged that the object is in the region.

(S17) It is judged that the object is outside the region.

Like this, in this embodiment, the server 2 is provided with the user objects 21a, 21b and 21c for holding the latest position information of the transmitter in the virtual space and the transmission region definition information for defining the transmission region, and the chat reception objects 22a and 22b for holding the latest position information of the application objects 3a and 3b, and the reception region definition information for defining the reception region, and only the contents of a chat issued from the transmitter in the reception region or only the contents of a chat issued from the transmitter when the reception object enters the transmission region are recorded in the chat storage file 4. Thus, by setting the transmission region and the reception region, the range where the chat is recorded can be restricted in the same server, and it becomes possible to freely set the region where the chat is recorded, without reducing the chat feasible region and without complicating the system.

Besides, since the transmission region and the reception region of this embodiment are closed regions constituted by two-dimensional elements, as compared with a closed region simply set by a sphere, the degree of freedom of the set shape is high, and it becomes possible to make detailed setting of the region where the chat is recorded.

Incidentally, in this embodiment, although the chat storage file 4 is connected to the server 2, it may be connected to the application object server 3 instead of the server 2. In this case, the contents of a chat on which judgement to record is made by the server 2 are transferred from the server 2 to the application server 3, and the application server 3 records the contents of the transferred chat in the chat storage file 4.

Besides, in this embodiment, although the chat reception objects 22*a* and 22*b* are dynamically defined correspondingly to the application objects 3*a* and 3*b* prepared by the application object server 3, such a structure may be adopted that the application object server 3 is not used but the chat reception objects 22*a* and 22*b* are read from a file at the time of starting the server.

Incidentally, the foregoing processing function can be realized by a computer. In that case, the processing contents of functions included in the server 2 and the application object server 3 are described in a program recorded in a computer readable recording medium. Then, this program is executed by the computer, so that the above processing is realized by the computer. As the computer readable recording medium, there is a magnetic recording device, a semiconductor memory or the like. In the case where it is put on the market, the program is stored in a portable recording medium, such as a CD-ROM (Compact Disk Read Only Memory) or a floppy disk, and can be put on the market, it can be provided to a user in a state where it is previously stored in a computer, it can be downloaded in a user's computer through a network, or it is stored in a memory device of a computer connected through a network and can be transferred to other computers through the network. When executed by the computer, the program is stored in a hard disk or the like in the computer, and it is loaded in a main memory and is executed.

As described above, in the virtual space system of the present invention, the transmission object holding means for holding the latest position information of the transmitter and the reception object holding means for holding the latest position information of the reception object and the reception region definition information for defining the reception region are provided, and only the contents of a chat issued from the transmitter in the reception region or only the contents of a chat issued from the transmitter when the reception object enters the transmission region are recorded, so that the range where the chat is recorded can be restricted in the same server by setting the transmission region and the reception region, and it becomes possible to freely set the region where the chat is recorded, without reducing the chat feasible region and complicating the system.

Besides, in the virtual space control device of the present invention, the transmission object holding means for holding the latest position information of the transmitter and the transmission region definition information, and the reception object holding means for holding the latest position information of the reception object and the reception region definition information for defining the reception region are provided, and only the contents of a chat issued from the transmitter in the reception region or only the contents of a chat issued from the transmitter when the reception object enters the transmission region are recorded, so that the range where the chat is recorded can be restricted in the same server by setting the transmission region and the reception region, and it becomes possible to freely set the region where the chat is recorded, without reducing the chat feasible region and complicating the system.

Besides, in the virtual space control method of the present invention, the latest position information of the transmitter and the transmission region definition information are held, the latest position information of the reception object and the reception region definition information for defining the reception region are held, and only the contents of a chat issued from the transmitter in the reception region or only the contents of a chat issued from the transmitter when the reception object enters the transmission region are recorded, so that the range where the chat is recorded can be restricted in the same server by setting the transmission region and the reception region, and it becomes possible to freely set the region where the chat is recorded, without reducing the chat feasible region and complicating the system.

Besides, in the recording medium of the present invention, there is stored a program for causing a computer to execute functions of holding the latest position information of the transmitter and the transmission region definition information, holding the latest position information of the reception object and the reception region definition information for defining the reception region, and recording only the contents of a chat issued from the transmitter in the reception region or only the contents of a chat issued from the transmitter when the reception object enters the transmission region, so that the range where the chat is recorded can be restricted in the same server by setting the transmission region and the reception region, and it becomes possible to freely set the region where the chat is recorded, without reducing the chat feasible region and complicating the system.

What is claimed is:

1. A virtual space system having a chat function, comprising:

at least two communicatively connected servers; a virtual space control device coupled to the at least two communicatively connected servers, the virtual space control device including:

transmission holding means for holding latest position information of a transmitter in a virtual space and transmission region definition information for defining a transmission region as a closed region on one of the at least two communicatively connected servers that includes the transmitter, reception object holding means for holding latest position information of a reception object and reception region definition information for defining a reception region as a closed region on another of the at least two communicatively connected servers that include the reception object; and at least one chat storage file for storing only contents of a chat issued from the transmitter in the reception region or only contents of a chat issued from the transmitter when the reception object enters the transmission region, wherein a reception region use flag information is used to determine whether the reception region is used, and in a case where the reception region use flag information indicates that the reception region is not used, storage of the contents of the chat is made while relation to the reception object holding means which has entered the transmission region is established, and in a case where the reception region use flag information indicates that the reception region is used, the storage is made while relation to the reception object holding means relative to the reception region where the transmitter has entered is established.

2. A virtual space system according to claim 1, wherein the reception object holding means further holds reception region use information indicating whether the reception region is used,     in a case where the reception region use information indicates that the reception region is not used, the at least one chat storage file stores only the contents of the chat issued from the transmitter when the reception object enters the transmission region, and     in a case where the reception region use information indicates that the reception region is used, the at least one chat storage file stores only the contents of the chat issued from the transmitter in the reception region.

3. A virtual space system according to claim 1, wherein the transmission region and the reception region are closed regions defined by two-dimensional elements.

4. A virtual space system according to claim 1, wherein the transmission region and the reception region are inner regions of polygonal columns each having a section of a polygon drawn on a horizontal plane in the virtual space.

5. A virtual space system according to claim 1, wherein the transmission region and the reception region are inner regions of segmental columns each having a section of a segment drawn on a horizontal plane in the virtual space.

6. A virtual space system according to claim 1, wherein the transmission region is defined while relation to the latest position information of the transmitter is established, and the reception region is defined while relation to the latest position information of the reception object is established.

7. A virtual space system according to claim 1, further comprising a reception object control device for preparing and controlling the reception object,     wherein the latest position information of the reception object and the reception region definition information are set while relation to the reception object is established.

8. A virtual space control device for controlling a virtual space having a chat function, comprising:

transmission object holding means for holding latest position information of a transmitter in the virtual space and transmission region definition information for defining a transmission region as a closed region on a first server at a side of the transmitter; and     reception object holding means for holding latest position information of a reception object and reception region definition information for defining a reception region as a closed region on a second server at a side of the reception object,     wherein only contents of a chat issued from the transmitter in the reception region or only contents of a chat issued from the transmitter when the reception object enters the transmission region are stored in at least one chat storage file, and wherein a reception region use flag information is used to determine whether the reception region is used, and in a case where the reception region use flag information indicates that the reception region is not used, storage of the contents of the chat is made while relation to the reception object holding means which has entered the transmission region is established, and in a case where the reception region use flag information indicates that the reception region is used, the storage is made while relation to the reception object holding means relative to the reception region where the transmitter has entered is established.

9. A control method of a virtual space having a chat function, comprising the steps of:

holding latest position information of a transmitter in the virtual space and transmission region definition information for defining a transmission region as closed region defined within a first server;

holding latest position information of a reception object and reception region definition information for defining a reception region as a closed region defined within a second server; and     storing in at least one chat storage file only contents of a chat issued from the transmitter in the reception region or only contents of a chat issued from the transmitter when the reception object enters the transmission region, wherein a reception region use flag information is used to determine whether the reception region is used, and in a case where the reception region use flag information indicates that the reception region is not used, storage of the contents of the chat is made while relation to the reception object holding means which has entered the transmission region is established, and in a case where the reception region use flag information indicates that the reception region is used, the storage is made while relation to the reception object holding means relative to the reception region where the transmitter has entered is established.

10. An information providing medium for providing a program which causes a computer to execute functions of:

holding latest position information of a transmitter in a virtual space and transmission region definition information for defining a transmission region as a closed region defined within a first server;

holding latest position information of a reception object in the virtual space and reception region definition for defining a reception region as a closed region defined within a second server; and     storing in at least one chat storage file only contents of a chat issued from the transmitter in the reception region or only contents of a chat issued from the transmitter when the reception object enters the transmission region, wherein a reception region use flag information is used to determine whether the reception region is used, and in a case where the reception region use flag information indicates that the reception region is not used, storage of the contents of the chat is made while relation to the reception object holding means which has entered the transmission region is established, and in a case where the reception region use flag information indicates that the reception region is used, the storage is made while relation to the reception object holding means relative to the reception region where the transmitter has entered is established.

* * * * *